US012177622B2

(12) United States Patent
Kumar et al.

(10) Patent No.: US 12,177,622 B2
(45) Date of Patent: Dec. 24, 2024

(54) CROSSTALK OFF EAR DETECTION FOR CIRCUMAURAL HEADSET

(71) Applicant: SKYWORKS SOLUTIONS, INC., Irvine, CA (US)

(72) Inventors: Amit Kumar, Portland, OR (US); Colin Michael Doolittle, Portland, OR (US); Thomas Lynn Kuntz, Portland, OR (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 274 days.

(21) Appl. No.: 17/948,563

(22) Filed: Sep. 20, 2022

(65) Prior Publication Data

US 2023/0109374 A1 Apr. 6, 2023

Related U.S. Application Data

(60) Provisional application No. 63/251,308, filed on Oct. 1, 2021.

(51) Int. Cl.
*H04R 1/10* (2006.01)

(52) U.S. Cl.
CPC ......... *H04R 1/1041* (2013.01); *H04R 1/1008* (2013.01)

(58) Field of Classification Search
None
See application file for complete search history.

(56) References Cited

U.S. PATENT DOCUMENTS

| | | | | |
|---|---|---|---|---|
| 9,894,452 | B1 * | 2/2018 | Termeulen | H04R 25/453 |
| 9,967,647 | B2 | 5/2018 | Kumar et al. | |
| 9,980,034 | B2 | 5/2018 | Kumar et al. | |
| 10,856,064 | B2 | 12/2020 | Wurtz et al. | |
| 11,032,631 | B2 | 6/2021 | Kumari et al. | |
| 11,366,633 | B2 | 6/2022 | O'Connor et al. | |
| 2019/0110121 | A1 * | 4/2019 | Sapozhnykov | H04R 1/1041 |
| 2019/0268682 | A1 * | 8/2019 | Li | H04R 5/033 |
| 2020/0275187 | A1 * | 8/2020 | Petrank | G10L 25/51 |
| 2021/0241747 | A1 * | 8/2021 | Steele | H04R 3/002 |

* cited by examiner

*Primary Examiner* — Harry S Hong
(74) *Attorney, Agent, or Firm* — Lando & Anastasi, LLP

(57) ABSTRACT

A circumaural headset having a first earcup and a second earcup can include a first transducer disposed with the first earcup and configured to transmit a first non-audible signal with an audible signal, a second transducer disposed within the second earcup and configured to receive the first non-audible signal from the first transducer, and an off-ear detection processor configured to determine whether the headset has been removed from the user's head based on the second transducer receiving the first non-audible signal from the first transducer.

23 Claims, 12 Drawing Sheets

CROSSTALK OFF EAR DETECTION FOR CIRCUMAURAL HEADSET

CROSS-REFERENCE TO RELATED APPLICATIONS

This application claims priority under 35 U.S.C. § 119 (e) to U.S. Provisional Patent Application Ser. No. 63/251,308, titled "CROSSTALK OFF EAR DETECTION FOR CIRCUMAURAL HEADSET," filed Oct. 1, 2021, the entire contents of which is incorporated herein by reference for all purposes.

TECHNICAL FIELD

Embodiments of the present disclosure are generally directed to methods and apparatuses for determining when a personal audio device, such as a circumaural headset, has been either or both removed from a user's head and replaced on the user's head during operation of the personal audio device.

BACKGROUND

Certain conventional personal audio devices use an infrared sensor in determining whether the device is in either an on-ear state or an off-ear state. Other conventional personal audio devices, such as the Pioneer® Rayz® earbuds, employ active noise cancellation (ANC) and can accomplish either or both on-ear detection and off-ear detection using speakers in the earbuds and microphones that are present for ANC. The Pioneer® Rayz® use a low-frequency, e.g., 20 Hz, tone that is played into the earbud as part of the processing to determine whether the earbud is in either an on-ear state or an off-ear state. At a frequency such as 20 Hz, however, software must sample the signal for a relatively long time before any on-ear/off-ear decision can be made.

Embodiments according to the disclosed technology address these and other limitations.

DETAILED DESCRIPTION

Figure 1:
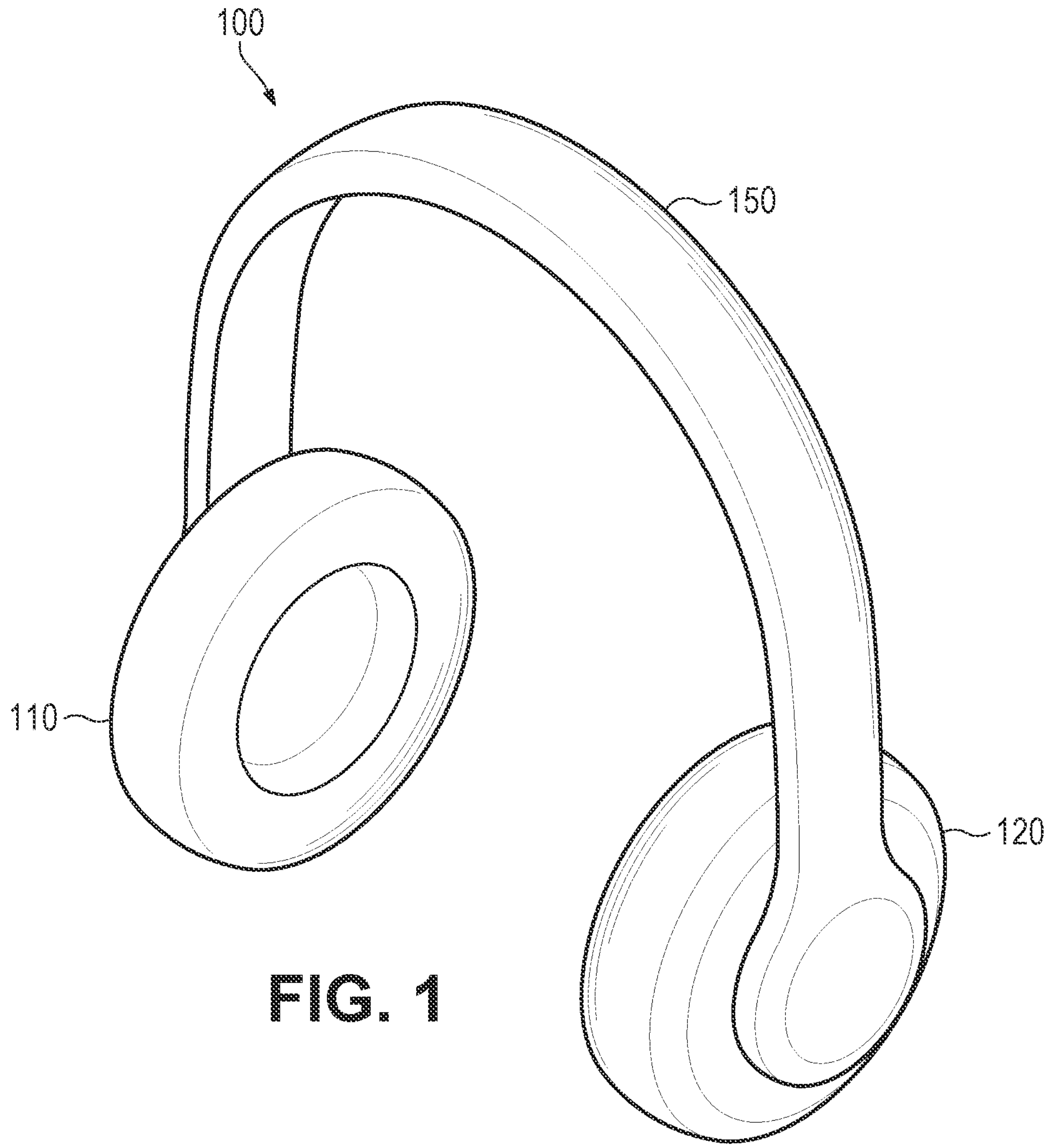
FIG. 1 is a perspective view illustrating an example of a conventional circumaural headset.

Embodiments of the disclosed technology are generally directed to methods and apparatuses for one or more personal audio devices, such as a circumaural headset, for example, to determine whether the personal audio device has been removed from a user's head, replaced on the user's head, or both. The user may wish to remove the headset from his or her head so that he or she may take a temporary break from listening to what the personal audio device is playing, for example. The user may subsequently replace the headset, e.g., to continue listening to whatever the personal audio device had been playing before the user removed the headset from his or her head.

A headset as described herein generally has two earcups or cup portions and is typically arranged to be worn such that each earcup—and thus corresponding transducer, e.g., speaker—is positioned on, around, or otherwise in close proximity to one of the user's ears, e.g., when the user desires to listen to music or other audio content that may be transmitted by either or both of the transducers.

The headset also generally includes a band or other mechanism that is configured to rest on top of or around the user's head so as to effectively maintain positioning of the speakers on, around, or otherwise in close proximity to the user's ears, e.g., so that the user may listen to music or other audio output that is transmitted by either one of or both of the speakers. The headphone may be circumaural or supra-aural, for example. The headphone may be wired or wireless.

Implementations of the disclosed technology are generally directed to circumaural headsets which, when not being worn by a user, typically have each earcup facing each other. For example, the user may place the headset such that the band rests on a stand or other support structure in which manner the earcups naturally face each other in a resting position. In such embodiments, a first transducer, e.g., a speaker, that is mounted within one of the earcups, e.g., the left earcup, can transmit a low-energy ultrasonic tone at a certain frequency f1 that can be detected by a second transducer, e.g., a microphone, that is mounted in the other earcup, e.g., the right earcup. In certain embodiments, the frequency f1 is at least 19 kHz.

In certain alternate implementations, e.g., to increase robustness, the second speaker, e.g., positioned within the right earcup, can transmit a second low-energy ultrasonic tone at a different frequency f2 that can be detected by the first transducer, e.g., positioned within the left earcup. In such embodiments, if either transducer can receive the tone being transmitted by the other transducer, a determination can be made that the headset has been removed from the user's head.

Responsive to a determination that the headset has been removed from the user's head, a processer or software can subsequently pause or otherwise halt whatever audio information was being transmitted by either or both transducers before the headset was removed from the user's head. The transmitted audio information may include music, narration, or sounds from a video game, for example. In certain embodiments, the audio information may pertain to a voice phone call in which the user was participating.

In situations where the user replaces the headset on his or her head, the user's head effectively blocks the ultrasonic signal(s) from being detected by the transducers. In such embodiments, the processor or software can then unpause or otherwise resume the music, narration, video game sounds, voice phone call, or other audio information that had been paused or halted.

Implementations of the disclosed technology generally includes the use of ultrasonic signals or tones such that determinations can be made on small timescales and, thus, are practically instantaneous with regard to the user's perception. Whereas prior low-frequency, e.g., 20 Hz signal, methods are susceptible to wind and motion noise, signals or tones within an ultrasonic frequency range are not. Also, whereas low-frequency signals or tones, e.g., 20 Hz, may be felt or otherwise detected by human eardrums at certain volumes, ultrasonic signals and tones are completely unnoticed by human ears.

Circumaural headsets typically allow the earcups to rotate such that they can settle into a natural position on the user's head. Many headsets allow the earcups to be rotated up to or even more than 90 degrees away from each other. In certain implementations, e.g., to more reliably detect an off-ear state, the physical design of the headset may be constrained so as to not allow the earcups to rotate past a certain angle. In such embodiments, the earcups may substantially face each other in virtually every off-ear configuration.

FIG. 1 is a perspective view illustrating an example of a conventional circumaural headset 100. In the example, the headset 100 includes a first earcup 110 that is configured to fit over a user's ear, and a second earcup 120 that is configured to fit over the user's other ear when the headset 100 is being worn by the user. In the example, the headset 100 also includes a connecting member 150, e.g., a band, that is configured to couple with both of the first and second earcups 110 and 120, respectively, and also to rest on or otherwise over the user's head while the user is wearing the headset 100.

Figure 2A:
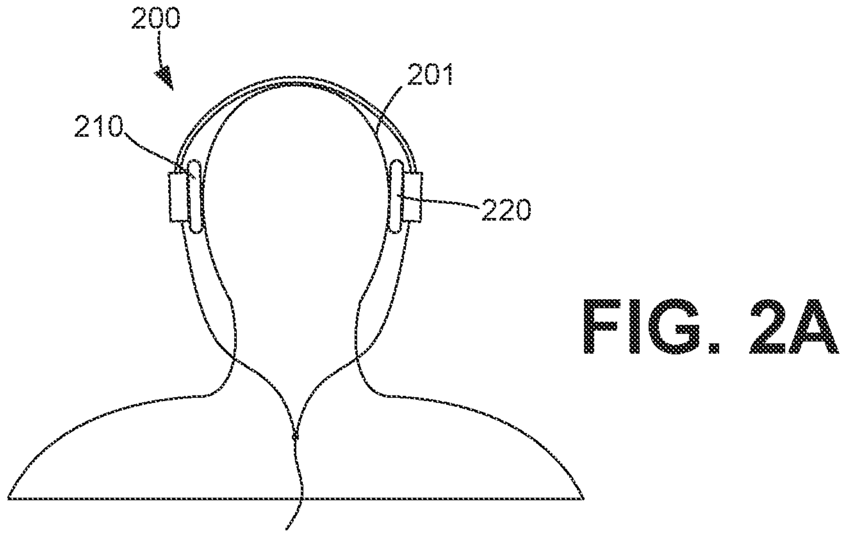
FIG. 2A is a front view illustrating an example of a circumaural headset on a user's head in accordance with certain implementations of the disclosed technology.

FIG. 2A is a front view illustrating an example of a circumaural headset 200, such as the headset 100 illustrated by FIG. 1, having a first earcup 210 and a second earcup 220 in accordance with certain implementations of the disclosed technology. In the example, the headset 200 is positioned on a user's head 201, e.g., to allow the user to listen to music or other audio information that may be transmitted by or otherwise in connection with either or both of the first and second earcups 210 and 220, respectively.

Figure 2B:
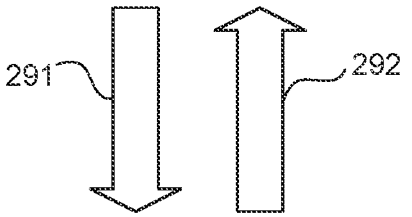
FIG. 2B is a front view illustrating an example of a circumaural headset off a user's head in accordance with certain implementations of the disclosed technology.
Figure 2B:
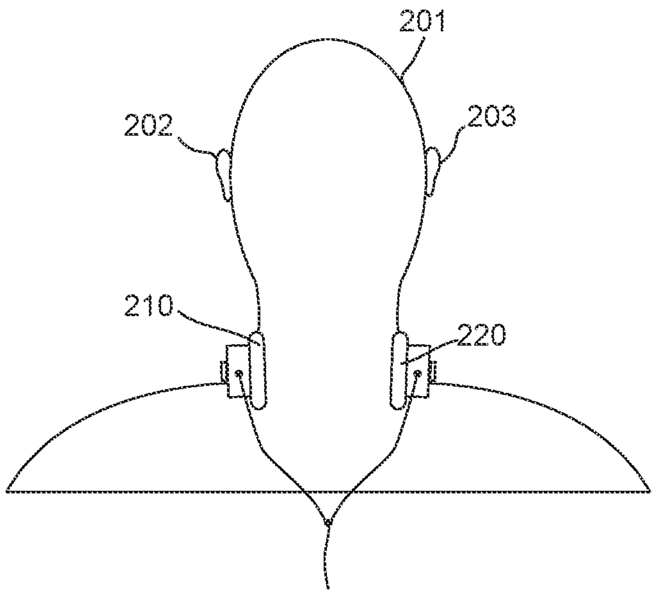

FIG. 2B is a front view illustrating an example of the circumaural headset 200 not positioned on the user's head 201 in accordance with certain implementations of the disclosed technology. In the example, the user may have not yet positioned the headset 200 on his or her head 201. Alternatively, the user may have had the headset 200 on his or her head 201 but then removed the headset 200 from his or her head 201, as indicated by 291, so that he or she may take a temporary break from listening to what audio information the earcup(s) 210 and 220 are transmitting, for example. The user may subsequently replace the headset 200 on his or her head 201, as indicated by 292, e.g., to continue listening to the audible information that the earcup(s) 210 and 220 are transmitting.

Certain embodiments include a circumaural headset having an off-ear detection system for determining whether the circumaural headset has been removed from a user's head, the headset having a band portion configured to rest on the user's head. The circumaural headset may be either wired or wireless.

The headset may include a first cup portion coupled with the band portion and configured to be secured around a first ear of the user and a first transducer positioned within the first cup portion and configured to transmit a first non-audible signal with an audible signal.

The headset may also include a second cup portion coupled with the band portion and configured to be secured around a second ear of the user, and a second transducer positioned within the second cup portion and configured to receive the first non-audible signal from the first transducer.

The headset may also include an off-ear detection processor configured to determine whether the headset has been removed from the user's head based on the second transducer receiving the first non-audible signal from the first transducer, for example.

Figure 3:
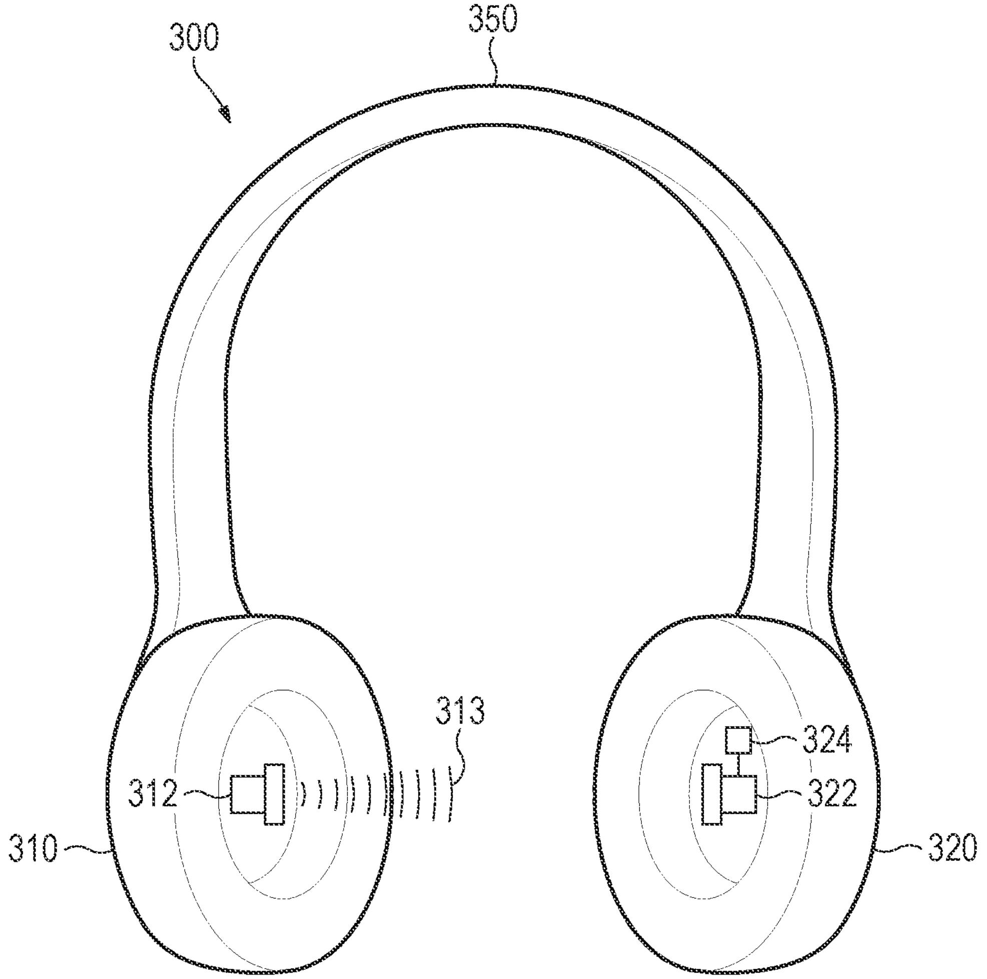
FIG. 3 is a perspective view illustrating an example of a circumaural headset having an off-ear detection processor in accordance with certain implementations of the disclosed technology.

FIG. 3 is a perspective view illustrating an example of a circumaural headset 300, such as the headset 100 illustrated by FIG. 1, having a first earcup 310, a second earcup 320, and an off-ear detection processor 324 in accordance with certain implementations of the disclosed technology. The circumaural headset 300 may be either wired or wireless.

In the example, the headset 300 includes a first transducer 312 that is disposed within the first earcup 310 and configured to transmit a first non-audible signal 313. The headset 300 also includes a second transducer 322 that is disposed within the second earcup 320 and configured to receive the first non-audible signal 313 from the first transducer 312.

In the example, the first transducer 312 transmits the non-audible signal 313, generally in combination or conjunction with an audible signal. In certain embodiments, the second transducer 322 may be configured to receive either or both the first non-audible signal 313 and the audible signal from the first transducer 312.

The audible signal may include music, an audiobook, narration, white noise, a voice call, or virtually any other suitable audible signal to which a user may listen. The first non-audible signal 313 may have a frequency that is greater than 19 kHz, for example, and may be a tone, a pulse, or any other signal suitable to be transmitted from the first transducer 312 to the second transducer 322.

The off-ear detection processor 324 may be configured to determine whether the headset 300 has been removed from the user's head based on the second transducer 322 receiving the first non-audible signal 313 from the first transducer 312. For example, the off-ear detection processor 324 may determine that the headset 300 has been removed from the user's headset responsive to the second transducer 322 successfully receiving the first non-audible signal 313 from the first transducer 312.

In such embodiments, the first and second earcups 310 and 320, respectively, are generally facing each other such that there is little to no physical obstruction, e.g., the user's head, between the two earcups 310 and 320; thus, the first non-audible signal 313 may be transmitted freely therebetween with little to no blocking thereof. In situations where the headset 300 is positioned such that there is a physical obstruction between the first and second transducers 312 and 322, respectively, e.g., a user's head, the first non-audible signal 313 is effectively blocked from reaching the second transducer 322.

In situations where the first non-audible signal 313 is not received by the second transducer 322, the off-ear detection processor 324 may determine that the headset 300 has been replaced or otherwise placed on the user's head and subsequently cause the audible signal to resume or otherwise be transmitted by the first transducer 312. For example, the off-ear detection processor 324 may determine whether the headset 300 has been replaced on the user's head based on the second transducer 322 no longer receiving the first non-audible signal 313 from the first transducer 310. In such situations, the off-ear detection processor 324 may determine whether the headset 300 has been replaced on the user's head based at least in part on a period of time between the second transducer 322 receiving the first non-audible signal 313 from the first transducer 312 and the second transducer 322 no longer receiving the first non-audible signal 313 from the first transducer 322.

In certain embodiments, the off-ear detection processor 324 may cause the first transducer 312 to pause transmitting the audible signal responsive to a determination that the headset 300 has been removed from the user's head. In such situations, the off-ear detection processor 324 may cause the first transducer 312 to resume transmitting the audible signal responsive to a determination that the headset 300 has been replaced on the user's head.

In certain embodiments, the first transducer 312 may transmit a second non-audible signal with the first non-audible signal 313 and the audible signal. The off-ear detection processor 324 may determine whether the headset 300 has been removed from the user's head based on the second transducer 322 receiving both the first non-audible signal 313 and the second non-audible signal from the first transducer 312. In such situations, the first non-audible signal 313 may have a first frequency and the second non-audible signal may have a second frequency that is distinct from the first frequency.

In certain embodiments, the second transducer 322 may transmit a second non-audible signal with the audible signal, and the first transducer 312 may receive the second audible signal from the second transducer 322. In such situations, the off-ear detection processor 324 may determine whether the headset 300 has been removed from the user's head based on either or both the second transducer 322 receiving the first non-audible signal 313 from the first transducer 312 and the first transducer 312 receiving the second non-audible signal from the second transducer 322.

Figure 4:
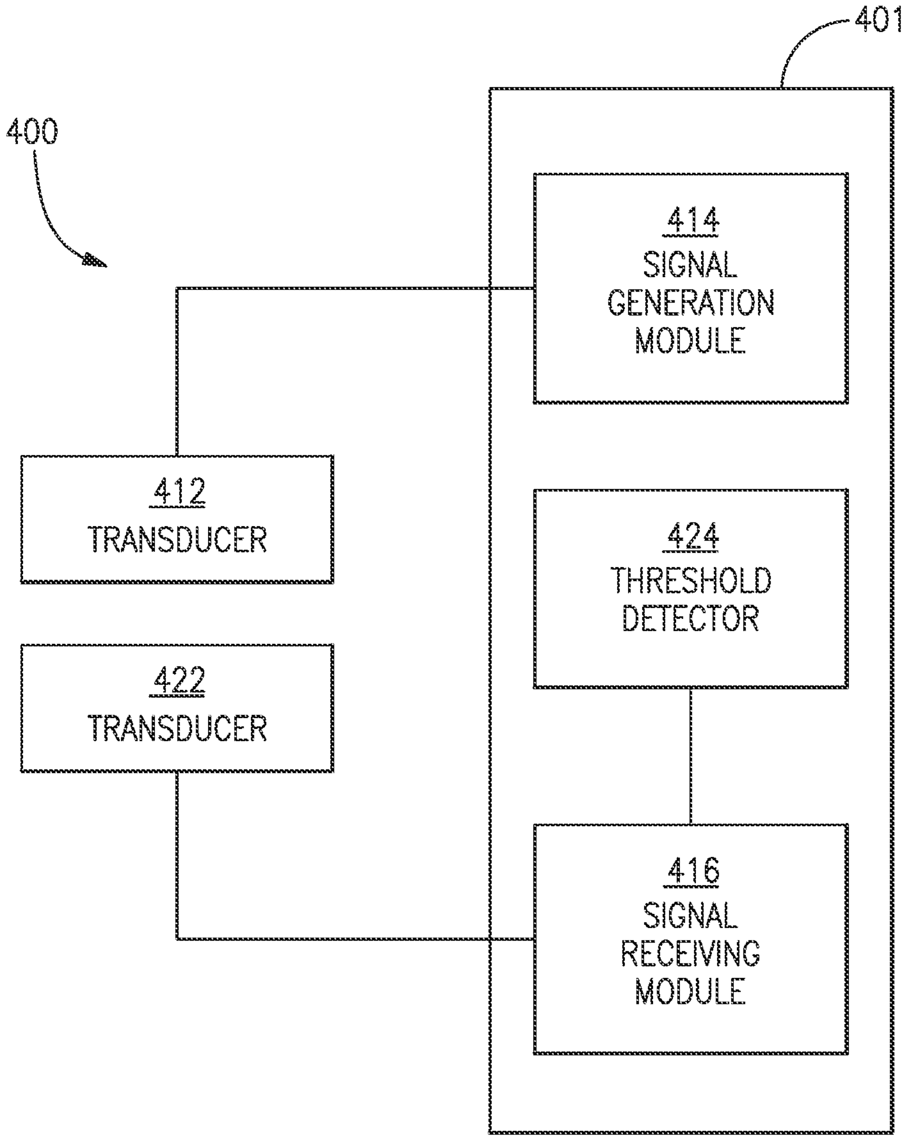
FIG. 4 is a functional block diagram illustrating a first example of circuitry for a headset in accordance with certain implementations of the disclosed technology.

FIG. 4 is a functional block diagram illustrating a first example 400 of circuitry for a headset in accordance with certain implementations of the disclosed technology. In the example 400, a signal generation module 414 is configured to generate a signal to be transmitted by a transducer 412. The transducer 412 may, for example, be the first transducer 312 of FIG. 3. In certain embodiments, the signal may be a non-audible ultrasonic tone or pulse having a frequency of at least 19 kHz.

The non-audible signal transmitted by the transducer 412 may be received by a transducer 422. The transducer 422 may, for example, be the second transducer 322 of FIG. 3.

A signal receiving module 416 is configured to receive signals that are received by the transducer 422. For example, the signal receiving module 416 may be configured to receive non-audible tones or pulses having a frequency of at least 19 kHz. The transducer 422 and signal receiving module 416 may be configured to receive audible signals in addition to or otherwise in connection with a non-audible signal.

In the example 400, a threshold detection module 424 is configured to determine whether a signal, such as an ultrasonic non-audible signal, is successfully received by the signal receiving module 416. The threshold detection module 424 may determine that the transducer 422 is no longer receiving or otherwise not receiving a certain type of signal, such as a non-audible ultrasonic frequency signal.

In certain implementations, the signal generation module 414, signal receiving module 416, and threshold detection module 424 are all part of a signal component 401, such as a processor or integrated circuit or circuit assembly.

Figure 5:
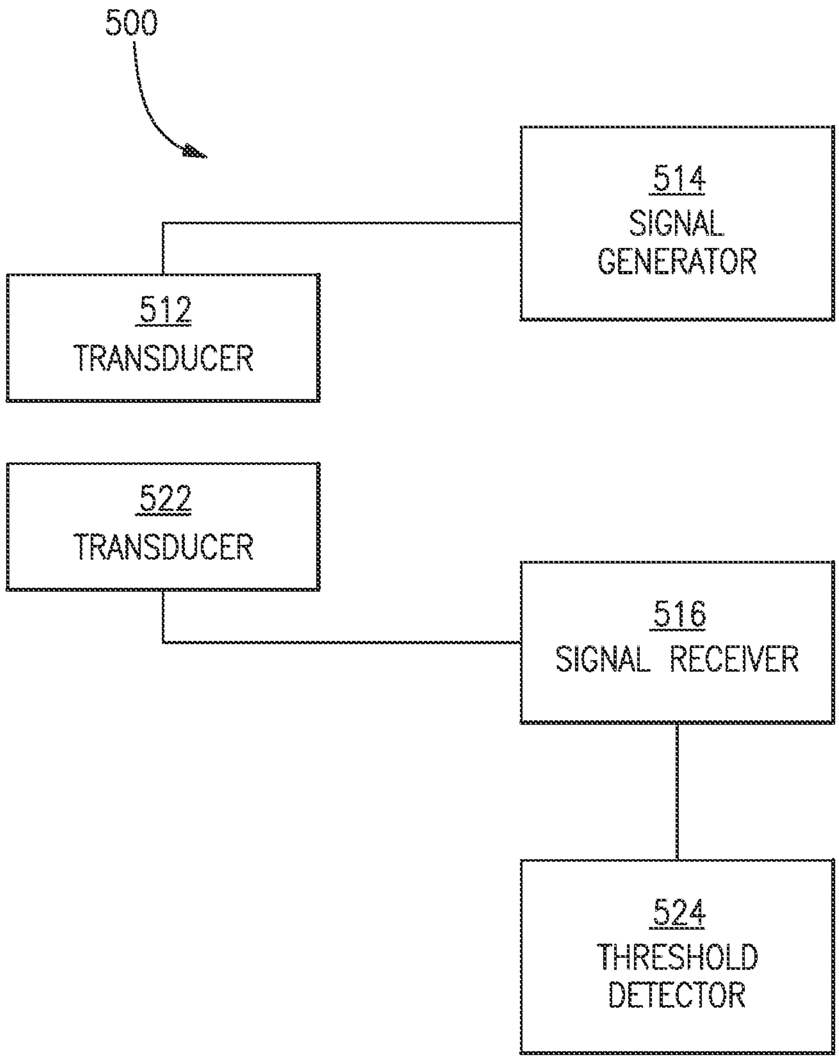
FIG. 5 is a functional block diagram illustrating a second example of circuitry for a headset in accordance with certain implementations of the disclosed technology.

FIG. 5 is a functional block diagram illustrating a second example 500 of circuitry for a headset in accordance with certain implementations of the disclosed technology. In the example 500, a signal generator 514 is configured to generate a signal to be transmitted by a transducer 512. The transducer 512 may, for example, be the first transducer 312 of FIG. 3. In certain embodiments, the signal may be a non-audible ultrasonic tone or pulse having a frequency of at least 19 kHz.

The non-audible signal transmitted by the transducer 512 may be received by a transducer 522. The transducer 522 may, for example, be the second transducer 322 of FIG. 3.

A signal receiver 516 is configured to receive signals that are received by the transducer 522. For example, the signal receiver 516 may be configured to receive non-audible tones or pulses having a frequency of at least 19 kHz. The transducer 522 and signal receiving module 516 may be configured to receive audible signals in addition to or otherwise in connection with a non-audible signal.

In the example 500, a threshold detector 524 is configured to determine whether a certain signal, such as an ultrasonic non-audible signal, is successfully received by the signal receiver 516. The threshold detector 524 may determine that the transducer 522 is no longer receiving or otherwise not receiving a certain type of signal, such as a non-audible ultrasonic frequency signal.

In certain implementations, the signal generator 514, signal receiver 516, and threshold detector 524 are separate components or component assemblies.

Certain embodiments may include a method for determining whether a circumaural headset has been removed from a user's head, the method comprising: transmitting an audible signal from a first transducer; transmitting a first non-audible signal with the audible signal from the first transducer; receiving the first non-audible signal from the first transducer by a second transducer; and determining whether the headset has been removed from the user's head based on the second transducer receiving the first non-audible signal from the first transducer. The circumaural headset may be either wired or wireless.

The method may include determining whether the headset has been replaced on the user's head based on the second transducer no longer receiving the first non-audible signal from the first transducer subsequent to a determination that the headset has been removed from the user's head. The method may also include determining whether the headset has been replaced on the user's head is based at least in part on a period of time between the second transducer receiving the first non-audible signal from the first transducer and the second transducer no longer receiving the first non-audible signal from the first transducer.

In certain embodiments, the method may include pausing the audible signal responsive to a determination that the headset has been removed from the user's head. In such situations, the method may further include resuming the audible signal responsive to a determination that the headset has been replaced on the user's head.

In certain embodiments, the method may include transmitting a second non-audible signal with the first non-audible signal and the audible signal. In such situations, determining whether the headset has been removed from the user's head may be based on the second transducer receiving both the first non-audible signal and the second non-audible signal from the first transducer.

In certain embodiments, the method may include transmitting a second non-audible signal with the audible signal from the second transducer. In such situations, the method may include receiving the second non-audible signal from the second transducer by the first transducer. Determining whether the headset has been removed from the user's head may be based on either or both the second transducer receiving the first non-audible signal from the first transducer and the first transducer receiving the second non-audible signal from the second transducer.

Figure 6:
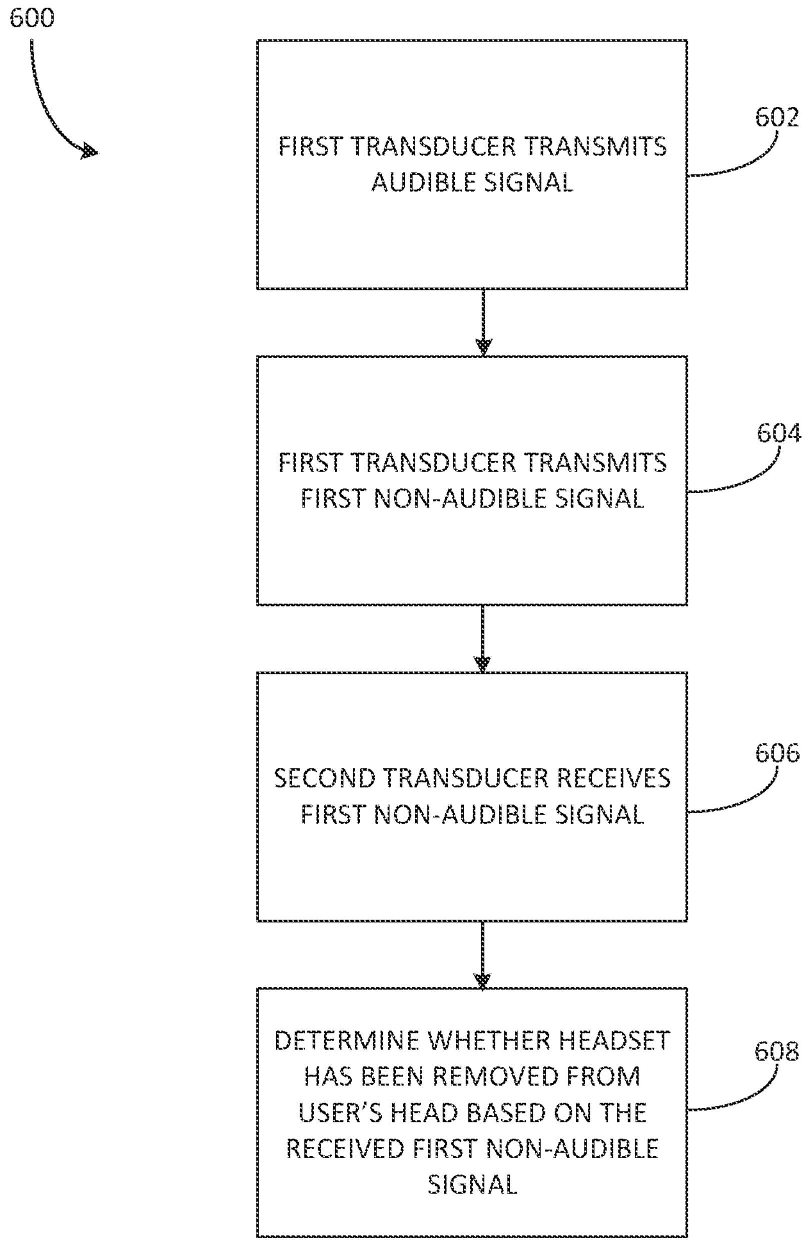
FIG. 6 is a flow diagram illustrating a first example of a set of operations for determining whether a circumaural headset has been removed from a user's head in accordance with certain implementations of the disclosed technology.

FIG. 6 is a flow diagram illustrating a first example of a set of operations 600 for determining whether a circumaural headset has been removed from a user's head in accordance with certain implementations of the disclosed technology.

At 602, a first transducer, such as the first transducer 312 illustrated by FIG. 3, transmits an audible signal, such as music, an audiobook, narration, white noise, a voice call, or virtually any other suitable audible signal to which a user may listen or otherwise hear.

At 604, the first transducer transmits a first non-audible signal, e.g., a tone or pulse having a frequency of at least 19 kHz, along with the audible signal.

At 606, a second transducer, such as the second transducer 322 illustrated by FIG. 3, receives the first non-audible signal from the first transducer.

At 608, a determination is made as to whether the circumaural headset has been removed from the user's head based on the second transducer receiving the first non-audible signal from the first transducer. For example, a processor, such as the off-ear detection processor 324 illustrated by FIG. 3, may determine that the headset has been removed from the user's head based on the second transducer successfully receiving the non-audible signal from the first transducer.

Figure 7:
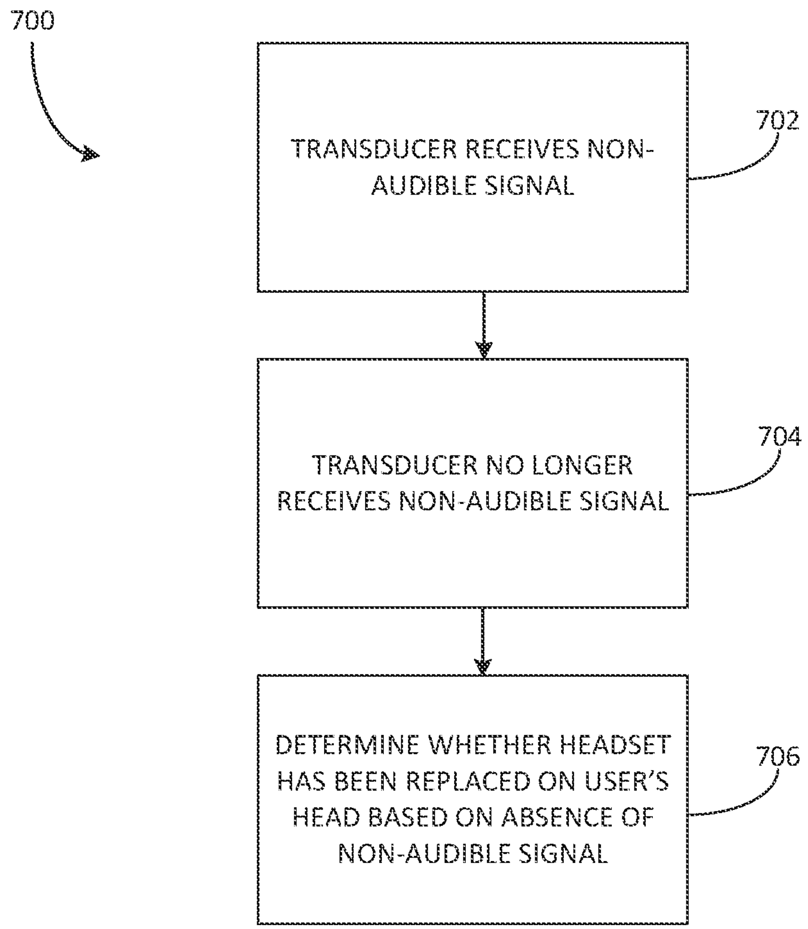
FIG. 7 is a flow diagram illustrating an example of a set of operations for determining whether a circumaural headset has been replaced a user's head in accordance with certain implementations of the disclosed technology.

FIG. 7 is a flow diagram illustrating an example of a set of operations 700 for determining whether a circumaural headset has been replaced a user's head in accordance with certain implementations of the disclosed technology.

At 702, a transducer, such as the second transducer 322 illustrated by FIG. 3, receives a non-audible signal, e.g., a signal or tone having a frequency of at least 19 KHz.

At 704, the transducer no longer receives the non-audible signal. This may happen in situations where an object, such as a user's head, for example, comes between or is otherwise positioned between the two earcups or cup portions of the headset and thus blocks or otherwise prevents the non-audible signal from being received by the transducer.

At 706, a processor, such as the off-ear detection processor 324 illustrated by FIG. 3, may determine that the headset has been replaced on or otherwise positioned on the user's head based on the transducer no longer receiving the non-audible signal. This may result from an object, e.g., the user's head, blocking the non-audible signal and thus preventing it from being received by the transducer.

Figure 8:
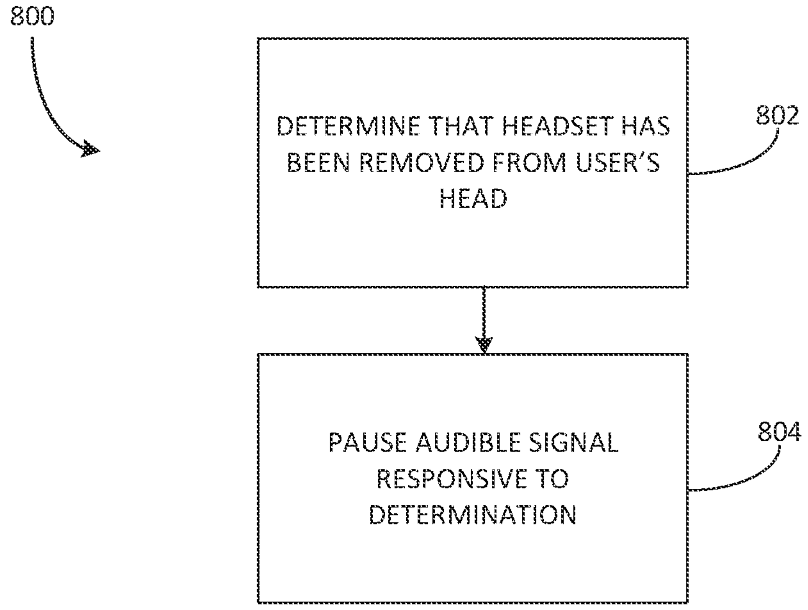
FIG. 8 is a flow diagram illustrating an example of a set of operations for pausing an audible signal responsive to the removal of a circumaural headset from a user's head in accordance with certain implementations of the disclosed technology.

FIG. 8 is a flow diagram illustrating an example of a set of operations 800 for pausing an audible signal responsive to the removal of a circumaural headset from a user's head in accordance with certain implementations of the disclosed technology.

At 802, a determination is made that the circumaural headset has been removed from a user's head. This determination may be made by a processor, such as the off-ear detection processor 324 illustrated by FIG. 3, responsive to a transducer of the headset receiving a non-audible signal, e.g., transmitted by another transducer of the headset.

At 804, an audible signal such as music, an audiobook, narration, white noise, or a voice call, may be paused or otherwise halted or stopped responsive to the determination at 802 that the headset has been removed from the user's head. This pausing may be pursuant to instructions from a processor, such as the off-ear detection processor 324 illustrated by FIG. 3, or suitable software.

Figure 9:
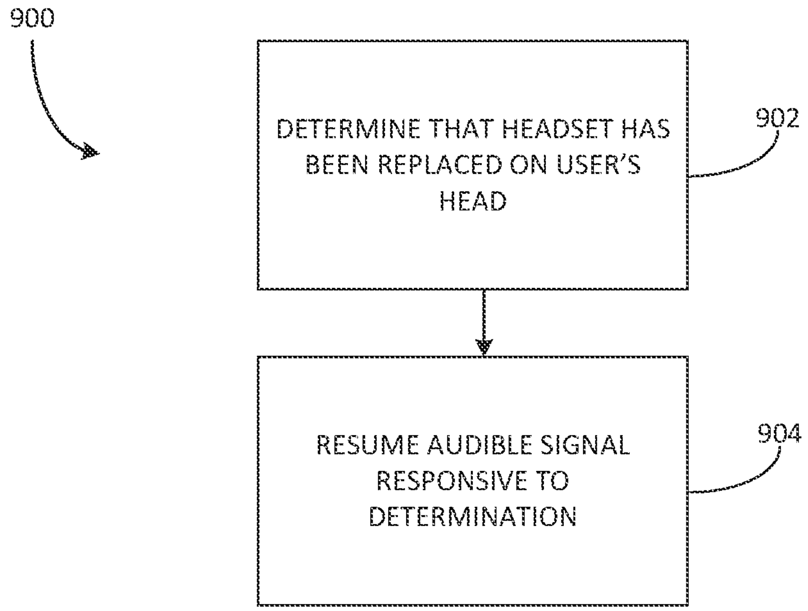
FIG. 9 is a flow diagram illustrating an example of a set of operations for resuming an audible signal responsive to the removal of a circumaural headset from a user's head in accordance with certain implementations of the disclosed technology.

FIG. 9 is a flow diagram illustrating an example of a set of operations 900 for resuming an audible signal responsive to the removal of a circumaural headset from a user's head in accordance with certain implementations of the disclosed technology.

At 902, a determination is made that the headset has been replaced on or otherwise place on the user's head. This determination may be made by a processor, such as the off-ear detection processor 324 illustrated by FIG. 3, and may be based on a second transducer of the headset no longer receiving a first non-audible signal from a first transducer of the headset subsequent to a determination that the headset has been removed from the user's head, such as at 802 of FIG. 8.

In certain embodiments, the determination at 902 may be based at least in part on a period of time between a second transducer of the headset receiving a first non-audible signal from a first transducer of the headset and the second transducer no longer receiving the first non-audible signal from the first transducer.

At 904, an audible signal such as music, an audiobook, narration, white noise, or a voice call, may be resumed or otherwise transmitted responsive to the determination at 902 that the headset has been replaced on the user's head. This resuming may be pursuant to instructions from a processor, such as the off-ear detection processor 324 illustrated by FIG. 3, or suitable software.

Figure 10:
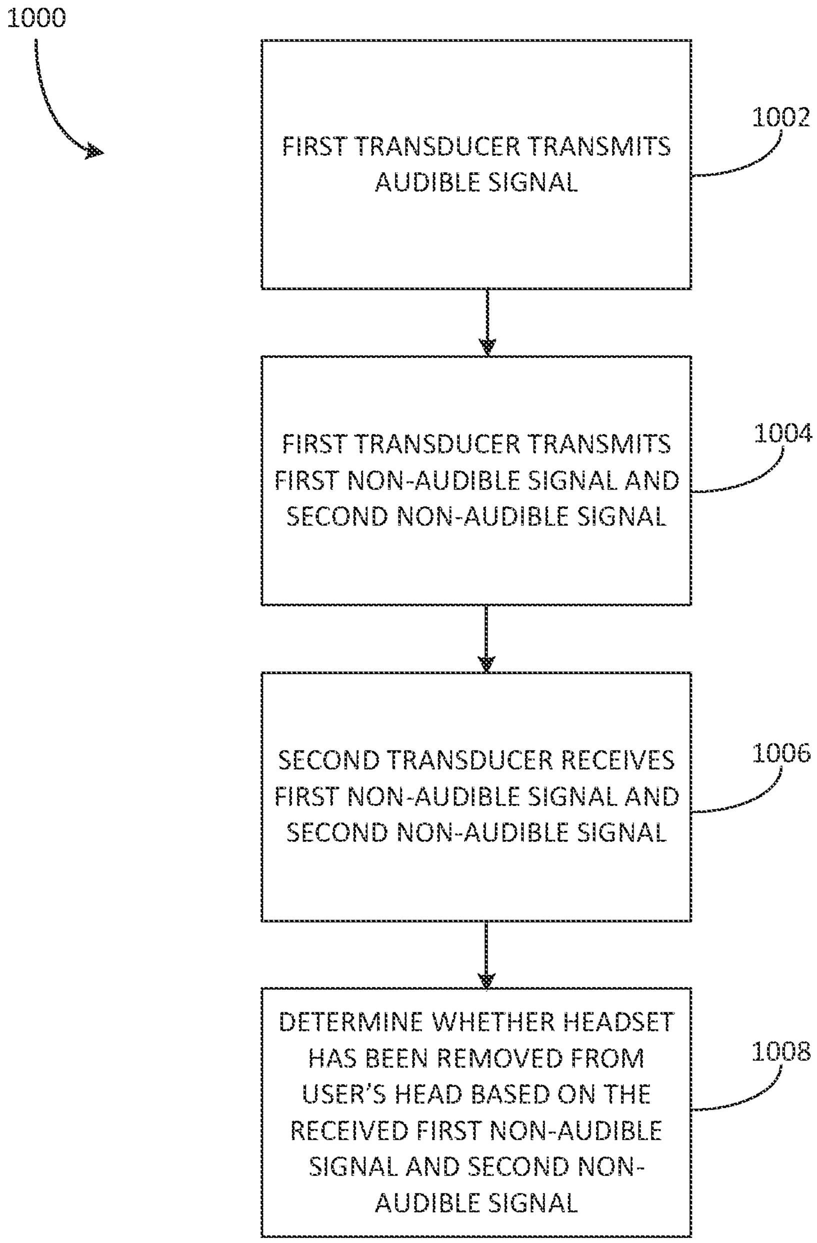
FIG. 10 is a flow diagram illustrating a second example of a set of operations for determining whether a circumaural headset has been removed from a user's head in accordance with certain implementations of the disclosed technology.

FIG. 10 is a flow diagram illustrating a second example of a set of operations 1000 for determining whether a circumaural headset has been removed from a user's head in accordance with certain implementations of the disclosed technology.

At 1002, a first transducer of the headset, such as the first transducer 312 illustrated by FIG. 3, transmits an audible signal, such as music, an audiobook, narration, white noise, a voice call, or virtually any other suitable audible signal to which a user may listen or otherwise hear.

At 1004, the first transducer transmits a first non-audible signal and a second non-audible signal. Either or both of the first and second non-audible signals may include a tone or pulse having a frequency of at least 19 kHz. The first non-audible signal may have a first ultrasonic frequency and the second non-audible signal may have a second, different ultrasonic frequency, for example. In certain embodiments, either or both of the first and second non-audible signals may be transmitted along with the audible signal that is transmitted at 1002.

At 1006, a second transducer of the headset, such as the second transducer 322 illustrated by FIG. 3, receives the first and second non-audible signals that are transmitted by the first transducer. In such embodiments, there is little to no physical obstruction between the first and second transducers, e.g., the headset is no longer or otherwise not on the user's head.

At 1008, a determination is made as to whether the circumaural headset has been removed from the user's head based on the second transducer receiving the first and second non-audible signals from the first transducer. For example, a processor, such as the off-ear detection processor 324 illustrated by FIG. 3, may determine that the headset has been removed from the user's head based on the second transducer successfully receiving both of the first and second non-audible signals from the first transducer.

Figure 11:
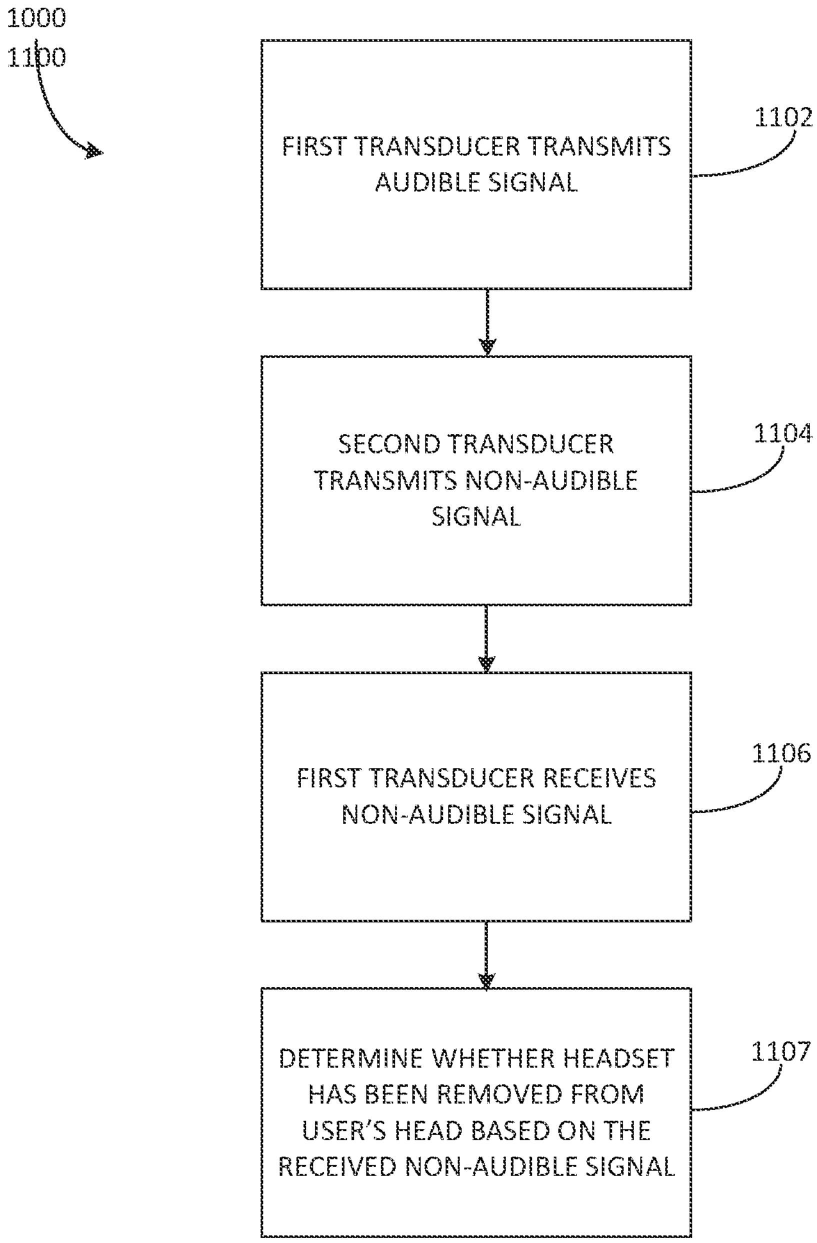
FIG. 11 is a flow diagram illustrating a third example of a set of operations for determining whether a circumaural headset has been removed from a user's head in accordance with certain implementations of the disclosed technology.

FIG. 11 is a flow diagram illustrating a third example of a set of operations 1100 for determining whether a circumaural headset has been removed from a user's head in accordance with certain implementations of the disclosed technology.

At 1102, a first transducer of the headset, such as the first transducer 312 illustrated by FIG. 3, transmits an audible signal, such as music, an audiobook, narration, white noise, a voice call, or virtually any other suitable audible signal to which a user may listen or otherwise hear.

At 1104, a second transducer of the headset, such as the second transducer 322 illustrated by FIG. 3, transmits a first non-audible signal, e.g., a tone or pulse having a frequency of at least 19 kHz. In certain embodiments, the second transducer may transmit the first non-audible signal in connection with or otherwise along with the audible signal.

At 1106, the first transducer receives the first non-audible signal from the second transducer. In the example, there is little to no obstruction that would substantially block or otherwise prevent the first transducer from receiving the first non-audible signal, e.g., the headset is presently not on the user's head.

At 1108, a determination is made as to whether the circumaural headset has been removed from the user's head based on the first transducer receiving the first non-audible signal from the second transducer. For example, a processor, such as the off-ear detection processor 324 illustrated by FIG. 3, or suitable software may determine that the headset has been removed from the user's head based on the first transducer receiving the non-audible signal transmitted by the second transducer.

Figure 12:
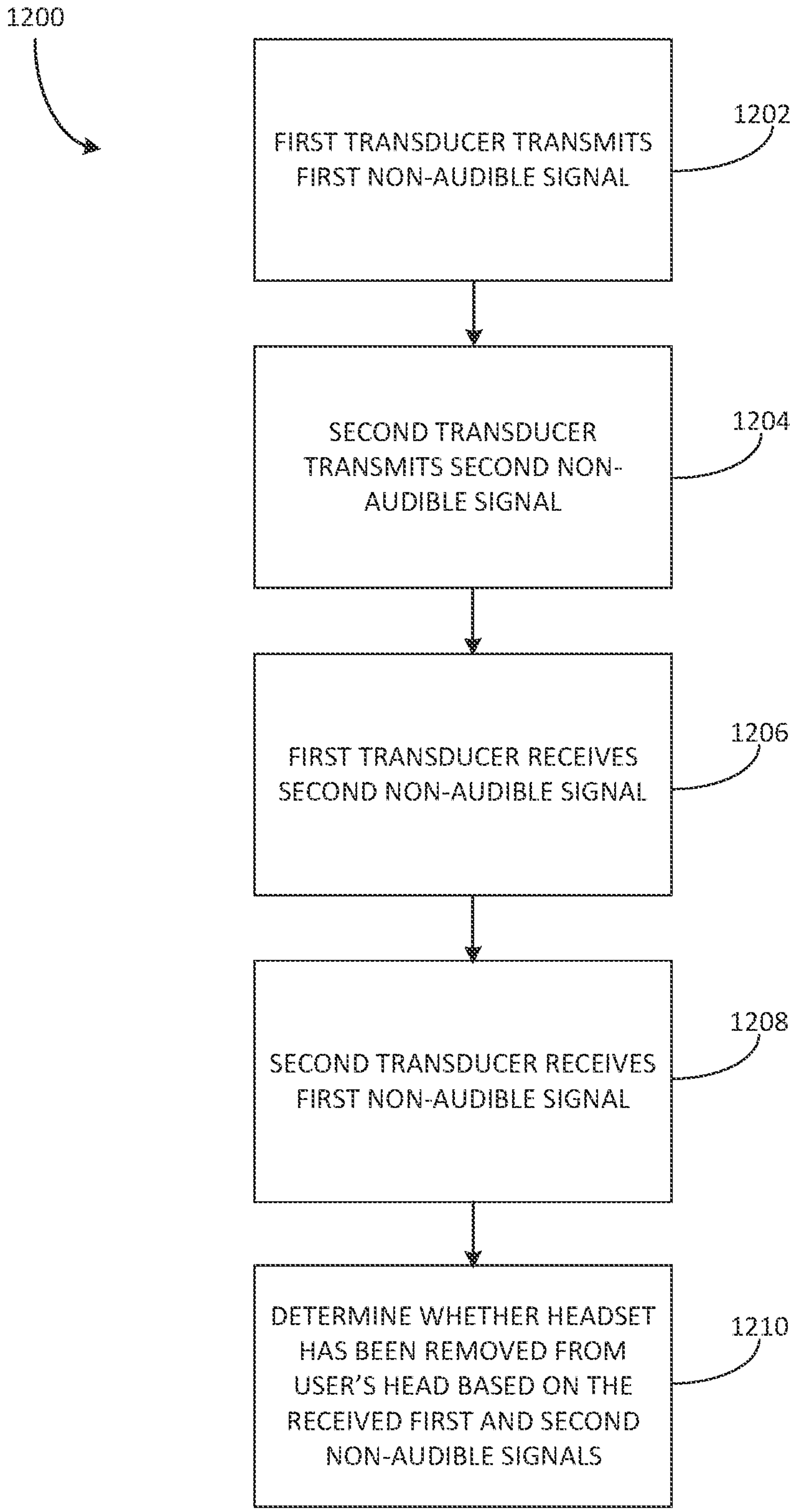
FIG. 12 is a flow diagram illustrating a fourth example of a set of operations for determining whether a circumaural headset has been removed from a user's head in accordance with certain implementations of the disclosed technology.

FIG. 12 is a flow diagram illustrating a fourth example of a set of operations 1200 for determining whether a circumaural headset has been removed from a user's head in accordance with certain implementations of the disclosed technology.

At 1202, a first transducer of the headset, such as the first transducer 312 illustrated by FIG. 3, transmits a first non-audible signal, e.g., a tone or pulse having a frequency of at least 19 kHz. In certain embodiments, the first transducer may transmit the first non-audible signal in connection with or otherwise along with an audible signal, such as music, an audiobook, narration, white noise, a voice call, or virtually any other suitable audible signal to which a user may listen or otherwise hear.

At 1204, a second transducer of the headset, such as the second transducer 322 illustrated by FIG. 3, transmits a second non-audible signal, e.g., a tone or pulse having a frequency of at least 19 kHz. In certain embodiments, the second transducer may transmit the second non-audible signal in connection with or otherwise along with an audible signal, such as music, an audiobook, narration, white noise, a voice call, or virtually any other suitable audible signal to which a user may listen or otherwise hear.

At 1206, the first transducer receives the second non-audible signal from the second transducer. In the example, there is little to no obstruction that would substantially block or otherwise prevent the first transducer from receiving the first non-audible signal, e.g., the headset is presently not on the user's head.

At 1208, the second transducer receives the first non-audible signal from the first transducer. In the example, there is little to no obstruction that would substantially block or otherwise prevent the first transducer from receiving the first non-audible signal, e.g., the headset is presently not on the user's head.

At 1210, a determination is made as to whether the circumaural headset has been removed from the user's head based on either or both the second transducer receiving the first non-audible signal from the first transducer and the first transducer receiving the second non-audible signal from the second transducer. For example, a processor, such as the off-ear detection processor 324 illustrated by FIG. 3, may determine that the headset has been removed from the user's head based on either or each transducer receiving the non-audible signals transmitted by the other transducer.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this disclosure to mean that other components, features, steps, processes, operations, etc. are optionally present. For example, an article "comprising" or "which comprises" components A, B, and C can contain only components A, B, and C, or it can contain components A, B, and C along with one or more other components.

Also, directions such as "right" and "left" are used for convenience and in reference to the diagrams provided in figures. But the disclosed subject matter may have a number of orientations in actual use or in different implementations. Thus, a feature that is vertical, horizontal, to the right, or to the left in the figures may not have that same orientation or direction in all implementations.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Although specific embodiments of the invention have been illustrated and described for purposes of illustration, it will be understood that various modifications may be made without departing from the spirit and scope of the invention. Accordingly, the invention should not be limited except as by the appended claims.

What is claimed is:

1. A circumaural headset having a first earcup and a second earcup, the headset comprising:

a first transducer disposed within the first earcup and configured to transmit a first non-audible signal with an audible signal;

a second transducer disposed within the second earcup and configured to receive the first non-audible signal from the first transducer; and an off-ear detection processor configured to determine whether the headset has been removed from a user's head based on the second transducer receiving the first non-audible signal from the first transducer.

2. The circumaural headset of claim 1 wherein subsequent to a determination that the headset has been removed from the user's head the off-ear detection processor is further configured to determine whether the headset has been replaced on the user's head based on the second transducer no longer receiving the first non-audible signal from the first transducer.

3. The circumaural headset of claim 2 wherein the off-ear detection processor is configured to determine whether the headset has been replaced on the user's head based at least in part on a period of time between the second transducer receiving the first non-audible signal from the first transducer and the second transducer no longer receiving the first non-audible signal from the first transducer.

4. The circumaural headset of claim 1 wherein the off-ear detection processor is further configured to cause the first transducer to pause transmitting the audible signal responsive to a determination that the headset has been removed from the user's head.

5. The circumaural headset of claim 4 wherein the off-ear detection processor is further configured to cause the first transducer to resume transmitting the audible signal responsive to a determination that the headset has been replaced on the user's head.

6. The circumaural headset of claim 1 wherein the first transducer is further configured to transmit a second non-audible signal with the first non-audible signal and the audible signal.

7. The circumaural headset of claim 6 wherein the off-ear detection processor is configured to determine whether the headset has been removed from the user's head based on the second transducer receiving both the first non-audible signal and the second non-audible signal from the first transducer.

8. The circumaural headset of claim 7 wherein the first non-audible signal has a first frequency and the second non-audible signal has a second frequency that is distinct from the first frequency.

9. The circumaural headset of claim 1 wherein the second transducer is configured to transmit a second non-audible signal with the audible signal.

10. The circumaural headset of claim 9 wherein the first transducer is further configured to receive the second non-audible signal.

11. The circumaural headset of claim 10 wherein the off-ear detection processor is configured to determine whether the headset has been removed from the user's head based on either or both the second transducer receiving the first non-audible signal from the first transducer and the first transducer receiving the second non-audible signal from the second transducer.

12. The circumaural headset of claim 1 wherein the non-audible signal has a frequency that is greater than 19 kHz.

13. A method for determining whether a circumaural headset has been removed from a user's head, the method comprising:

transmitting an audible signal from a first transducer;

transmitting a first non-audible signal with the audible signal from the first transducer;

receiving the first non-audible signal from the first transducer by a second transducer; and determining whether the headset has been removed from the user's head based on the second transducer receiving the first non-audible signal from the first transducer.

14. The method of claim 13 further comprising determining whether the headset has been replaced on the user's head based on the second transducer no longer receiving the first non-audible signal from the first transducer subsequent to a determination that the headset has been removed from the user's head.

15. The method of claim 14 wherein determining whether the headset has been replaced on the user's head is based at least in part on a period of time between the second transducer receiving the first non-audible signal from the first transducer and the second transducer no longer receiving the first non-audible signal from the first transducer.

16. The method of claim 13 further comprising pausing the audible signal responsive to a determination that the headset has been removed from the user's head.

17. The method of claim 16 further comprising resuming the audible signal responsive to a determination that the headset has been replaced on the user's head.

18. The method of claim 13 further comprising transmitting a second non-audible signal with the first non-audible signal and the audible signal.

19. The method of claim 18 wherein determining whether the headset has been removed from the user's head is based on the second transducer receiving both the first non-audible signal and the second non-audible signal from the first transducer.

20. The method of claim 13 further comprising transmitting a second non-audible signal with the audible signal from the second transducer.

21. The method of claim 20 further comprising receiving the second non-audible signal from the second transducer by the first transducer.

22. The method of claim 21 wherein determining whether the headset has been removed from the user's head is based on either or both the second transducer receiving the first non-audible signal from the first transducer and the first transducer receiving the second non-audible signal from the second transducer.

23. A circumaural headset having an off-ear detection system for determining whether the circumaural headset has been removed from a user's head, the headset comprising:

a band portion configured to rest on the user's head;

a first cup portion coupled with the band portion and configured to be secured around a first ear of the user;

a first transducer positioned within the first cup portion and configured to transmit a first non-audible signal with an audible signal;

a second cup portion coupled with the band portion and configured to be secured around a second ear of the user;

a second transducer positioned within the second cup portion and configured to receive the first non-audible signal from the first transducer; and an off-ear detection processor configured to determine whether the headset has been removed from the user's head based on the second transducer receiving the first non-audible signal from the first transducer.

* * * * *